United States Patent
Kim

(10) Patent No.: US 11,468,886 B2
(45) Date of Patent: Oct. 11, 2022

(54) ARTIFICIAL INTELLIGENCE APPARATUS FOR PERFORMING VOICE CONTROL USING VOICE EXTRACTION FILTER AND METHOD FOR THE SAME

(71) Applicant: LG ELECTRONICS INC., Seoul (KR)

(72) Inventor: Jaehong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 298 days.

(21) Appl. No.: 16/493,741

(22) PCT Filed: Mar. 12, 2019

(86) PCT No.: PCT/KR2019/002856
§ 371 (c)(1),
(2) Date: Sep. 12, 2019

(87) PCT Pub. No.: WO2020/184753
PCT Pub. Date: Sep. 17, 2020

(65) Prior Publication Data
US 2021/0327418 A1    Oct. 21, 2021

(51) Int. Cl.
*G10L 17/00* (2013.01)
*G10L 15/22* (2006.01)
*G10L 15/02* (2006.01)
(Continued)

(52) U.S. Cl.
CPC .............. *G10L 15/22* (2013.01); *G06F 21/31* (2013.01); *G10L 15/02* (2013.01); *G10L 17/00* (2013.01);
(Continued)

(58) Field of Classification Search
None
See application file for complete search history.

(56) References Cited

U.S. PATENT DOCUMENTS 6,119,088 A * 9/2000 Ciluffo .................... G10L 15/26
704/275
10,032,451 B1 * 7/2018 Mamkina ................ G10L 15/01
(Continued)

FOREIGN PATENT DOCUMENTS

CN         108962260 A   * 12/2018
KR         101330328        11/2013
(Continued)

OTHER PUBLICATIONS

PCT International Application No. PCT/KR2019/002856, Written Opinion of the International Searching Authority dated Dec. 12, 2019, 8 pages.

*Primary Examiner* — Richard Z Zhu
(74) *Attorney, Agent, or Firm* — Lee, Hong, Degerman, Kang & Waimey PC

(57) ABSTRACT

According to an embodiment of the present invention, an artificial intelligence (AI) apparatus for performing voice control, includes a memory configured to store a voice extraction filter for extracting a voice of a registered user, and a processor to receive identification information of a user and a first voice signal of the user, to register the user using the received identification information, to extract a voice of the registered user from the received second voice signal by using the voice extraction filter corresponding to the registered user, when a second voice signal is received, and to proceed a control operation corresponding to intention information of the extracted voice of the registered user. The voice extraction filter is generated by using the received first voice signal of the registered user.

9 Claims, 9 Drawing Sheets

| USER IDENTIFICATION INFORMATION | WHOLE AUTHORITY LEVEL | PERSONAL AUTHORITY LEVEL |
|---|---|---|
| USER 1 | 1 | CALENDAR APPLICATION: ALLOWED |
| USER 2 | 2 | MESSENGER APPLICATION: NON-ALLOWED |
| USER 3 | 3 | - |

(51) Int. Cl.
*G06F 21/31* (2013.01)
*G10L 15/18* (2013.01)
*G06F 21/32* (2013.01)
*G10L 17/22* (2013.01)

(52) U.S. Cl.
CPC .......... *G06F 21/32* (2013.01); *G10L 15/1815* (2013.01); *G10L 15/1822* (2013.01); *G10L 17/22* (2013.01); *G10L 2015/223* (2013.01)

(56) References Cited

U.S. PATENT DOCUMENTS

| | | | | |
|---|---|---|---|---|
| 10,074,089 | B1* | 9/2018 | Rangaraj | G06Q 20/40145 |
| 10,410,650 | B2* | 9/2019 | Gong | B60R 11/0217 |
| 10,476,872 | B2* | 11/2019 | McLaren | H04L 63/0861 |
| 2003/0009333 | A1* | 1/2003 | Sharma | G10L 15/04 |
| | | | | 704/246 |
| 2012/0245941 | A1* | 9/2012 | Cheyer | H04L 63/10 |
| | | | | 704/246 |
| 2014/0358535 | A1 | 12/2014 | Lee et al. | |
| 2015/0081295 | A1* | 3/2015 | Yun | G10L 17/24 |
| | | | | 704/244 |
| 2017/0069327 | A1 | 3/2017 | Heigold et al. | |
| 2017/0116986 | A1* | 4/2017 | Weng | G10L 15/22 |
| 2019/0035395 | A1* | 1/2019 | Yumoto | G10L 15/22 |
| 2019/0043510 | A1* | 2/2019 | Wang | H04L 47/125 |
| 2019/0378518 | A1 | 12/2019 | Jeong et al. | |
| 2020/0162451 | A1* | 5/2020 | Alhawaj | G06F 21/45 |

FOREIGN PATENT DOCUMENTS

| | | |
|---|---|---|
| KR | 1020140139982 | 12/2014 |
| KR | 101603830 | 3/2016 |
| KR | 101868711 | 6/2018 |
| KR | 101883301 | 7/2018 |

* cited by examiner

FIG. 5

| REQUIRED AUTHORITY LEVEL | APPLICATION | RANGE | REMARKS |
|---|---|---|---|
| 1 | - HOME IOT DEVICE CONTROL APP.<br>- MUSIC APP. | HOME CONTROL AND MEDIA SERVICE | - |
| 2 | - CALENDAR APP<br>- MAIL APP<br>- MESSENGER APP<br>- CONTACT APP | PERSONAL INFORMATION | - |
| 3 | - AUTHENTICATION APP<br>- BANK APP<br>- PAYMENT APP | FINANCIAL INFORMATION AND PERSONAL AUTHENTICATION INFORMATION | ADDITIONAL AUTHENTICATION REQUIRED<br>- IRIS RECOGNITION<br>- FINGERPRINT REOGNITION |

FIG. 6

| USER IDENTIFICATION INFORMATION | WHOLE AUTHORITY LEVEL | PERSONAL AUTHORITY LEVEL |
|---|---|---|
| USER 1 | 1 | CALENDAR APPLICATION: ALLOWED |
| USER 2 | 2 | MESSENGER APPLICATION: NON-ALLOWED |
| USER 3 | 3 | - |

ARTIFICIAL INTELLIGENCE APPARATUS FOR PERFORMING VOICE CONTROL USING VOICE EXTRACTION FILTER AND METHOD FOR THE SAME

CROSS-REFERENCE TO RELATED APPLICATIONS

This application is the National Stage filing under 35 U.S.C. 371 of International Application No. PCT/KR2019/002856, filed on Mar. 12, 2019, the contents of which are hereby incorporated by reference herein in its entirety.

TECHNICAL FIELD

The present invention relates to an artificial intelligence apparatus for performing voice control using a voice extraction filter, and a method for the same. More particularly, the present invention provides an AI apparatus for extracting a voice of each user from a voice input using a voice extraction filter for each user, for recognizing the extracted voice for each user, and for performing voice control corresponding to the recognized intention information of the voice, and a method for the same.

BACKGROUND ART

Recently, as the demand for voice assistants for smartphones (for example, Bixby, Google Assistant, and LG QVoice) increases, the need for a voice recognition technology with a higher voice recognition rate is increasing. A voice recognition technology has voice recognition performances varied depending on the surrounding environment, and there is a problem that the performance is greatly deteriorated under the abnormal noise environment, such as the voice of the surrounding people, surrounding music, or TV sound.

In addition, although smart phones or devices with a voice recognition function frequently contain sensitive information, such as personal information, or payment information for the user, there is a problem that other users can access this sensitive information. This is because users are not clearly distinguished therebetween through voice recognition, or personalized authority setting for each user is not made.

Accordingly, there is required a method for ensuring security by recognizing the voice of a user with higher precision and by distinguishing between users in a voice control system, even if noise is mixed or voices of several users are simultaneously input.

PRIOR ART

Patent Document (Patent Document 1) Korean Patent Registration No. 10-1603830

DISCLOSURE

Technical Problem

The present invention is to provide an AI apparatus for registering a user together with the voice information of the user, for more exactly recognizing the voice of a user using a voice extraction filter for a registered user when a voice is input, and for performing a control operation corresponding to the content information thereof, and a method for the same.

The present invention is to provide an AI apparatus for controlling an activation state of user registration information for registered users and for performing only voice control for a user corresponding to the activated user registration information, and a method for the same.

The present invention is to provide an AI apparatus for providing voice control functions differentiated depending on registered users and a method for the same.

Technical Solution

According to an embodiment of the present invention, there is provided an AI apparatus for registering a user together with the voice information of the user, for extracting the voice of the registered user using the voice extraction filter for each user, which is obtained by using the voice information of each user, when the voice is input, and for performing a control operation corresponding to content information of the extracted voice, and a method for the same.

According to an embodiment of the present invention, there is provided an AI apparatus for controlling the activation state of the user registration information for registered users and performing only voice control for the user corresponding to the activated user registration information, and a method for the same.

According to an embodiment of the present invention, there is provided an AI apparatus for registering a user together with authority information for each user when registering the user, thereby performing voice control depending on whether the registered user has the authority to perform the control operation corresponding to the input voice, when the voice of the registered user is input, and a method for the same.

Advantageous Effects

According to various embodiments of the present invention, even if noise is included or the voices of several persons are in the input voice signal, the voice for the registered user may be more exactly recognized. Accordingly, the voice control function may be provided with the higher recognition rate and accuracy.

According to various embodiments of the present invention, even registered users may individually determine the activation state and thus the registered users may be flexibly managed.

According to various embodiments of the present invention, since different control authorities may be set according to users, even registered users are differentiated in voice control to be performed by them. Accordingly, the security for the voice control function may be enhanced.

DESCRIPTION OF DRAWINGS

FIG. 5 is a view illustrating required authority information for each control item according to the embodiment of the present invention.

FIG. 6 is a view illustrating authority information of each user according to an embodiment of the present invention.

BEST MODE

Mode for Invention

Figure 1:
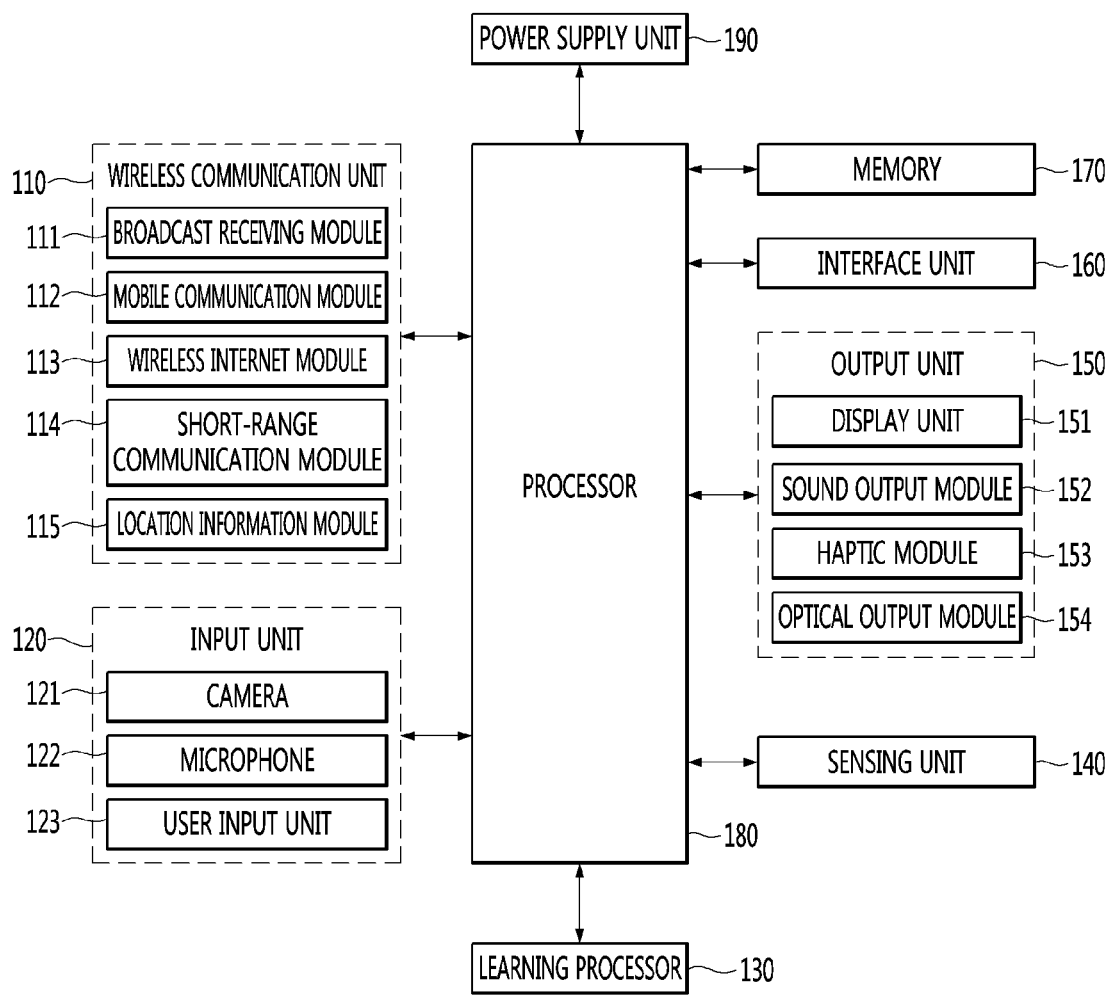
FIG. 1 is a block diagram illustrating a configuration of a terminal according to an embodiment of the present invention.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

Artificial intelligence (AI) is one field of computer engineering and information technology for studying a method of enabling a computer to perform thinking, learning, and self-development that can be performed by human intelligence and may denote that a computer imitates an intelligent action of a human.

Moreover, AI is directly/indirectly associated with the other field of computer engineering without being individually provided. Particularly, at present, in various fields of information technology, an attempt to introduce AI components and use the AI components in solving a problem of a corresponding field is being actively done.

Machine learning is one field of AI and is a research field which enables a computer to perform learning without an explicit program.

In detail, machine learning may be technology which studies and establishes a system for performing learning based on experiential data, performing prediction, and autonomously enhancing performance and algorithms relevant thereto. Algorithms of machine learning may use a method which establishes a specific model for obtaining prediction or decision on the basis of input data, rather than a method of executing program instructions which are strictly predefined.

The term "machine learning" may be referred to as "machine learning".

In machine learning, a number of machine learning algorithms for classifying data have been developed. Decision tree, Bayesian network, support vector machine (SVM), and artificial neural network (ANN) are representative examples of the machine learning algorithms.

The decision tree is an analysis method of performing classification and prediction by schematizing a decision rule into a tree structure.

The Bayesian network is a model where a probabilistic relationship (conditional independence) between a plurality of variables is expressed as a graph structure. The Bayesian network is suitable for data mining based on unsupervised learning.

The SVM is a model of supervised learning for pattern recognition and data analysis and is mainly used for classification and regression.

The ANN is a model which implements the operation principle of biological neuron and a connection relationship between neurons and is an information processing system where a plurality of neurons called nodes or processing elements are connected to one another in the form of a layer structure.

The ANN is a model used for machine learning and is a statistical learning algorithm inspired from a neural network (for example, brains in a central nervous system of animals) of biology in machine learning and cognitive science.

In detail, the ANN may denote all models where an artificial neuron (a node) of a network which is formed through a connection of synapses varies a connection strength of synapses through learning, thereby obtaining an ability to solve problems.

The term "ANN" may be referred to as "neural network".

The ANN may include a plurality of layers, and each of the plurality of layers may include a plurality of neurons. Also, the ANN may include a synapse connecting a neuron to another neuron.

The ANN may be generally defined by the following factors: (1) a connection pattern between neurons of a different layer; (2) a learning process of updating a weight of a connection; and (3) an activation function for generating an output value from a weighted sum of inputs received from a previous layer.

The ANN may include network models such as a deep neural network (DNN), a recurrent neural network (RNN), a bidirectional recurrent deep neural network (BRDNN), a multilayer perceptron (MLP), and a convolutional neural network (CNN), but is not limited thereto.

In this specification, the term "layer" may be referred to as "layer".

The ANN may be categorized into single layer neural networks and multilayer neural networks, based on the number of layers.

General single layer neural networks is configured with an input layer and an output layer.

Moreover, general multilayer neural networks is configured with an input layer, at least one hidden layer, and an output layer.

The input layer is a layer which receives external data, and the number of neurons of the input layer is the same the number of input variables, and the hidden layer is located between the input layer and the output layer and receives a signal from the input layer to extract a characteristic from the received signal and may transfer the extracted characteristic to the output layer. The output layer receives a signal from the hidden layer and outputs an output value based on the received signal. An input signal between neurons may be multiplied by each connection strength (weight), and values obtained through the multiplication may be summated. When the sum is greater than a threshold value of a neuron, the neuron may be activated and may output an output value obtained through an activation function.

The DNN including a plurality of hidden layers between an input layer and an output layer may be a representative ANN which implements deep learning which is a kind of machine learning technology.

The term "deep learning" may be referred to as "deep learning".

The ANN may be learned by using training data. Here, training may denote a process of determining a parameter of the ANN, for achieving purposes such as classifying, regressing, or clustering input data. A representative example of a parameter of the ANN may include a weight assigned to a synapse or a bias applied to a neuron.

An ANN learned based on training data may classify or cluster input data, based on a pattern of the input data.

In this specification, an ANN learned based on training data may be referred to as a trained model.

Next, a learning method of an ANN will be described.

The learning method of the ANN may be largely classified into supervised learning, unsupervised learning, semi-supervised learning, and reinforcement learning.

The supervised learning may be a method of machine learning for analogizing one function from training data.

Moreover, in analogized functions, a function of outputting continual values may be referred to as regression, and a function of predicting and outputting a class of an input vector may be referred to as classification.

In the supervised learning, an ANN may be learned in a state where a label of training data is assigned.

Here, the label may denote a right answer (or a result value) to be inferred by an ANN when training data is input to the ANN.

In this specification, a right answer (or a result value) to be inferred by an ANN when training data is input to the ANN may be referred to as a label or labeling data.

Moreover, in this specification, a process of assigning a label to training data for learning of an ANN may be referred to as a process which labels labeling data to training data.

In this case, training data and a label corresponding to the training data may configure one training set and may be inputted to an ANN in the form of training sets.

Training data may represent a plurality of features, and a label being labeled to training data may denote that the label is assigned to a feature represented by the training data. In this case, the training data may represent a feature of an input object as a vector type.

An ANN may analogize a function corresponding to an association relationship between training data and labeling data by using the training data and the labeling data. Also, a parameter of the ANN may be determined (optimized) through evaluating the analogized function.

The unsupervised learning is a kind of machine learning, and in this case, a label may not be assigned to training data.

In detail, the unsupervised learning may be a learning method of training an ANN so as to detect a pattern from training data itself and classify the training data, rather than to detect an association relationship between the training data and a label corresponding to the training data.

Examples of the unsupervised learning may include clustering and independent component analysis.

In this specification, the term "clustering" may be referred to as "clustering".

Examples of an ANN using the unsupervised learning may include a generative adversarial network (GAN) and an autoencoder (AE).

The GAN is a method of improving performance through competition between two different AIs called a generator and a discriminator.

In this case, the generator is a model for creating new data and generates new data, based on original data.

Moreover, the discriminator is a model for recognizing a pattern of data and determines whether inputted data is original data or fake data generated from the generator.

Moreover, the generator may be learned by receiving and using data which does not deceive the discriminator, and the discriminator may be learned by receiving and using deceived data generated by the generator. Therefore, the generator may evolve so as to deceive the discriminator as much as possible, and the discriminator may evolve so as to distinguish original data from data generated by the generator.

The AE is a neural network for reproducing an input as an output.

The AE may include an input layer, at least one hidden layer, and an output layer.

In this case, the number of node of the hidden layer may be smaller than the number of nodes of the input layer, and thus, a dimension of data may be reduced, whereby compression or encoding may be performed.

Moreover, data outputted from the hidden layer may enter the output layer. In this case, the number of nodes of the output layer may be larger than the number of nodes of the hidden layer, and thus, a dimension of the data may increase, and thus, decompression or decoding may be performed.

The AE may control the connection strength of a neuron through learning, and thus, input data may be expressed as hidden layer data. In the hidden layer, information may be expressed by using a smaller number of neurons than those of the input layer, and input data being reproduced as an output may denote that the hidden layer detects and expresses a hidden pattern from the input data.

The semi-supervised learning is a kind of machine learning and may denote a learning method which uses both training data with a label assigned thereto and training data with no label assigned thereto.

As a type of semi-supervised learning technique, there is a technique which infers a label of training data with no label assigned thereto and performs learning by using the inferred label, and such a technique may be usefully used for a case where the cost expended in labeling is large.

The reinforcement learning may be a theory where, when an environment where an agent is capable of determining an action to take at every moment is provided, the best way is obtained through experience without data.

The reinforcement learning may be performed by a Markov decision process (MDP).

To describe the MDP, firstly an environment where pieces of information needed for taking a next action of an agent may be provided, secondly an action which is to be taken by the agent in the environment may be defined, thirdly a reward provided based on a good action of the agent and a penalty provided based on a poor action of the agent may be defined, and fourthly an optimal policy may be derived through experience which is repeated until a future reward reaches a highest score.

An artificial neural network may be specified in structure by a configuration of a model, an activation function, a loss function, or a cost function, a learning algorithm, an optimization algorithm, and the like. A hyperparameter may be set in advance before the learning, and then, a model parameter may be set through the learning to specify contents thereof.

For example, factors that determine the structure of the artificial neural network may include the number of hidden layers, the number of hidden nodes included in each of the hidden layers, an input feature vector, a target feature vector, and the like.

The hyperparameter includes various parameters that have to be initially set for learning such as an initial value of the model parameter. Also, the model parameter includes various parameters to be determined through the learning.

For example, the hyperparameter may include an initial weight value between the nodes, an initial bias between the nodes, a mini-batch size, the number of learning repetition, a learning rate, and the like. Also, the model parameter may include a weight between the nods, a bias between the nodes, and the like.

The loss function can be used for an index (reference) for determining optimum model parameters in a training process of an artificial neural network. In an artificial neural network, training means a process of adjusting model parameters to reduce the loss function and the object of training can be considered as determining model parameters that minimize the loss function.

The loss function may mainly use a mean squared error (MSE) or a cross entropy error (CEE), but the present invention is not limited thereto.

The CEE may be used when a correct answer label is one-hot encoded. One-hot encoding is an encoding method for setting a correct answer label value to 1 for only neurons corresponding to a correct answer and setting a correct answer label to 0 for neurons corresponding to a wrong answer.

A learning optimization algorithm may be used to minimize a loss function in machine learning or deep learning, as the learning optimization algorithm, there are Gradient Descent (GD), Stochastic Gradient Descent (SGD), Momentum, NAG (Nesterov Accelerate Gradient), Adagrad, AdaDelta, RMSProp, Adam, and Nadam.

The GD is a technique that adjusts model parameters such that a loss function value decreases in consideration of the gradient of a loss function in the current state.

The direction of adjusting model parameters is referred to as a step direction and the size of adjustment is referred to as a step size.

Here, the step size may mean the learning rate.

In the GD, a gradient may be acquired by partially differentiating the loss function into each of the model parameters, and the model parameters may be updated by changing the model parameters by the learning rate in a direction of the acquired gradient.

The SGD is a technique that increases the frequency of gradient descent by dividing training data into mini-batches and performing the GD for each of the mini-batches.

The Adagrad, AdaDelta, and RMSProp in the SGD are techniques that increase optimization accuracy by adjusting the step size. The momentum and the NAG in the SGD are techniques that increase optimization accuracy by adjusting the step direction. The Adam is a technique that increases optimization accuracy by adjusting the step size and the step direction by combining the momentum and the RMSProp. The Nadam is a technique that increases optimization accuracy by adjusting the step size and the step direction by combining the NAG and the RMSProp.

The learning speed and accuracy of an artificial neural network greatly depends on not only the structure of the artificial neural network and the kind of a learning optimization algorithm, but the hyperparameters. Accordingly, in order to acquire a good trained model, it is important not only to determine a suitable structure of an artificial neural network, but also to set suitable hyperparameters.

In general, hyperparameters are experimentally set to various values to train an artificial neural network, and are set to optimum values that provide stable learning speed and accuracy using training results.

FIG. 1 is a block diagram illustrating a configuration of the terminal 100, according to an embodiment of the present invention.

Hereinafter, the terminal 100 may be referred to as an AI device 100 or an AI apparatus 100 for performing voice control.

The terminal 100 may be implemented for a TV, a projector, a mobile phone, a smart phone, a laptop computer, a digital broadcasting terminal, a personal digital assistant (PDA), a portable multimedia player (PMP) a slate PC, a tablet PC, an ultrabook, a wearable device (for example, a smartwatch, a smart glass, a head mounted display (HMD)), a set-top box (STB), a DMB receiver, a radio, a washing machine, a refrigerator, a desktop computer, fixed equipment such as a digital signage, movable equipment, and the like.

That is, the terminal device 100 may be implemented as various appliances that are used at home, and may be applied to a fixed or movable robot.

The terminal device 100 can perform a function of a voice agent. The voice agent may be a program that recognizes voice of a user and output a response suitable for the recognized user's voice using voice.

Referring to FIG. 1, the terminal 100 may include a wireless communication unit 110, an input unit 120, a learning processor 130, a sensing unit 140, an output unit 150, an interface unit 160, a memory 170, a processor 180, and a power supply unit 190.

The trained model may be mounted on the terminal 100.

The trained model may be implemented as hardware, software, or a combination of the hardware and the software. When a portion or the whole of the trained model is implemented as the software, one or more commands constituting the trained model may be stored in the memory 170.

The wireless communication unit 110 may include at least one of a broadcast receiving module 111, a mobile communication module 112, a wireless Internet module 113, a short-range communication module 114, or a location information module 115.

The broadcast receiving module 111 of the wireless communication unit 110 may receive a broadcast signal and/or broadcast related information from an external broadcast management server through a broadcast channel.

The mobile communication module 112 may transmit/receive a wireless signal to/from at least one of a base station, an external terminal, or a server on a mobile communication network established according to the technical standards or communication methods for mobile communication (for example, Global System for Mobile communication (GSM), Code Division Multi Access (CDMA), Code Division Multi Access 2000 (CDMA2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), and Long Term Evolution-Advanced (LTE-A)).

The wireless Internet module 113 refers to a module for wireless internet access and may be built in or external to the mobile terminal 100. The wireless Internet module 113 may be configured to transmit/receive a wireless signal in a communication network according to wireless internet technologies.

The wireless internet technology may include Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A) and the wireless internet module 113 transmits/receives data according at least one wireless internet technology including internet technology not listed above.

The short-range communication module 114 may support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, or Wireless Universal Serial Bus (USB) technologies.

The location information module 115 is a module for obtaining the location (or the current location) of a mobile terminal and its representative examples include a global positioning system (GPS) module or a Wi-Fi module. For example, the mobile terminal may obtain its position by using a signal transmitted from a GPS satellite through the GPS module.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

The input unit 120 may acquire training data for the model learning and input data to be used when an output is acquired using the trained model.

The input unit 120 may acquire input data that is not processed. In this case, the processor 180 or the learning processor 130 may preprocess the acquired data to generate training data that is capable of being inputted into the model learning or preprocessed input data.

Here, the preprocessing for the input data may mean extracting of an input feature from the input data.

Then, the input unit 120 is used for inputting image information (or signal), audio information (or signal), data, or information inputted from a user and the mobile terminal 100 may include at least one camera 121 in order for inputting image information.

The camera 121 processes image frames such as a still image or a video obtained by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the mobile terminal 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the mobile terminal 100 to correspond to the inputted information.

The user input unit 123 may include a mechanical input means (or a mechanical key, for example, a button, a dome switch, a jog wheel, and a jog switch at the front, back or side of the mobile terminal 100) and a touch type input means. As one example, a touch type input means may include a virtual key, a soft key, or a visual key, which is displayed on a touch screen through software processing or may include a touch key disposed at a portion other than the touch screen.

The learning processor 130 learns a model composed of the artificial neural network by using the training data.

Particularly, the learning processor 130 may determine optimized model parameters of the artificial neural network by repeatedly learning the artificial neural network by using the above-described various learning techniques.

In this specification, since the artificial neural network is learned by using the training data, the artificial neural network of which the parameters are determined may be called a learned model or a trained model.

Here, the trained model may be used to infer results for new input data rather than training data.

The learning processor 130 may be configured to receive, classify, store, and output information which is to be used for data mining, data analysis, intelligent decision, and machine learning algorithms.

The learning processor 130 may include one or more memory units which are configured to store data received, detected, sensed, generated, pre-defined, or outputted by another component, another device, another terminal, or an apparatus communicating with the terminal.

The learning processor 130 may include a memory which is integrated into or implemented in a terminal. In some embodiments, the learning processor 130 may be implemented with the memory 170.

Optionally or additionally, the learning processor 130 may be implemented with a memory associated with a terminal like an external memory directly coupled to the terminal or a memory which is maintained in a server communicating with the terminal.

In another embodiment, the learning processor 130 may be implemented with a memory maintained in a cloud computing environment or another remote memory position accessible by a terminal through a communication manner such as a network.

The learning processor 130 may be configured to store data in one or more databases, for supervised or unsupervised learning, data mining, prediction analysis, or identifying, indexing, categorizing, manipulating, storing, searching for, and outputting data to be used in another machine. Here, the database may be implemented using a memory 170, a memory 230 of the learning device 200, a memory maintained under cloud computing environments, or other remote memory locations that are accessible by the terminal through a communication scheme such as a network.

Information stored in the learning processor 130 may be used by the processor 180 or one or more other controllers of a terminal by using at least one of various different types of data analysis algorithm or machine learning algorithm.

Examples of such algorithms may include a k-nearest neighbor system, a purge logic (for example, possibility theory), a neural network, Boltzmann machine, vector quantization, a pulse neural network, a support vector machine, a maximum margin classifier, hill climbing, an induction logic system Bayesian network, perrytnet (for example, a finite state machine, a milli machine, and a moor finite state machine), a classifier tree (for example, a perceptron tree, a support vector tree, a Markov tree, a decision tree forest, and an arbitrary forest), a reading model and system, artificial mergence, sensor mergence, image mergence, reinforcement mergence, augment reality, pattern recognition, and automated plan.

The processor 180 may determine or predict at least one executable operation of a terminal, based on information determined or generated by using a data analysis algorithm and a machine learning algorithm. To this end, the processor 180 may request, search for, receive, or use data of the learning processor 130 and may control the terminal to execute a predicted operation or a preferably determined operation of the at least one executable operation.

The processor 180 may perform various functions of implementing an intelligent emulation (i.e., a knowledge-based system, an inference system, and a knowledge acquisition system). The processor 180 may be applied to various types of systems (for example, a purge logic system) including an adaptive system, a machine learning system, and an ANN.

The processor 180 may include a sub-module enabling an arithmetic operation of processing a voice and a natural language voice, like an input/output (I/O) processing module, an environment condition processing module, a speech-to-text (STT) processing module, a natural language processing module, a work flow processing module, and a service processing module.

Each of such sub-modules may access one or more systems or data and models or a subset or superset thereof in a terminal. Also, each of the sub-modules may provide various functions in addition to vocabulary index, user data, a work flow model, a service model, and an automatic speech recognition (ASR) system.

In another embodiment, another aspect of the processor 180 or a terminal may be implemented with the sub-module, system, or data and model.

In some embodiments, based on data of the learning processor 130, the processor 180 may be configured to detect and sense a requirement on the basis of an intention of a user or a context condition expressed as a user input or a natural language input.

The processor 180 may actively derive and obtain information which is needed in completely determining the requirement on the basis of the intention of the user or the context condition. For example, the processor 180 may analyze past data including an input log, an output log, pattern matching, unambiguous words, and an input intention, thereby actively deriving needed for determining the requirement.

The processor 180 may determine task flow for executing a function of responding to the requirement, based on the intention of the user or the context condition.

The processor 180 may be configured to collect, sense, extract, detect, and/or receive a signal or data used for data analysis and a machine learning operation through one or more sensing components in a terminal, for collecting information which is to be processed and stored in the learning processor 130.

Collecting of information may include an operation of sensing information through a sensor, an operation of extracting information stored in the memory 170, or an operation of receiving information through a communication means from another terminal, an entity, or an external storage device.

The processor 180 may collect usage history information from the terminal and may store the collected usage history information in the memory 170.

The processor 180 may determine an optimal match for executing a specific function by using the stored usage history information and prediction modeling.

The processor 180 may receive or sense ambient environmental information or other information through the sensing unit 140.

The processor 180 may receive a broadcast signal and/or broadcast-related information, a wireless signal, and wireless data through the wireless communication unit 110.

The processor 180 may receive image information (or a corresponding signal), audio information (or a corresponding signal), data, or user input information through the input unit 120.

The processor 180 may collect information in real time and may process or classify the collected information (for example, a knowledge graph, an instruction policy, an individualization database, a dialogue engine, etc.) and may store the processed information in the memory 170 or the learning processor 130.

When an operation of the terminal is determined based on the data analysis algorithm, the machine learning algorithm, and technology, the processor 180 may control elements of the terminal for executing the determined operation. Also, the processor 180 may control the terminal according to a control instruction to perform the determined operation.

When a specific operation is performed, the processor 180 may analyze history information representing execution of the specific operation through the data analysis algorithm, the machine learning algorithm, and technique and may update previously learned information, based on the analyzed information.

Therefore, the processor 180 may enhance an accuracy of a future performance of each of the data analysis algorithm, the machine learning algorithm, and the technique along with the learning processor 130, based on the updated information.

The sensing unit 140 may include at least one sensor for sensing at least one of information in a mobile terminal, environmental information around a mobile terminal, or user information.

For example, the sensing unit 140 may include at least one of a proximity sensor, an illumination sensor, a touch sensor, an acceleration sensor, a magnetic sensor, a G-sensor, a gyroscope sensor, a motion sensor, an RGB sensor, an infrared (IR) sensor, a finger scan sensor, an ultrasonic sensor, an optical sensor (for example, the camera 121), a microphone (for example, the microphone 122), a battery gauge, an environmental sensor (for example, a barometer, a hygrometer, a thermometer, a radiation sensor, a thermal sensor, and a gas sensor), or a chemical sensor (for example, an electronic nose, a healthcare sensor, and a biometric sensor). Moreover, a mobile terminal disclosed in this specification may combines information sensed by at least two or more sensors among such sensors and may then utilize it.

The output unit 150 is used to generate a visual, auditory, or haptic output and may include at least one of a display unit 151, a sound output module 152, a haptic module 153, or an optical output module 154.

The display unit 151 may display (output) information processed in the mobile terminal 100. For example, the display unit 151 may display execution screen information of an application program running on the mobile terminal 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the mobile terminal 100 and a user, and an output interface between the mobile terminal 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the mobile terminal 100. An example of an event occurring in the mobile terminal 100 includes message reception, call signal reception, missed calls, alarm, schedule notification, e-mail reception, and information reception through an application.

The interface unit 160 may serve as a path to various kinds of external devices connected to the mobile terminal 100. The interface unit 160 may include at least one of a wired/wireless headset port, an external charger port, a wired/wireless data port, a memory card port, a port connecting a device equipped with an identification module, an audio Input/Output (I/O) port, an image I/O port, and or an earphone port. In correspondence to that an external device is connected to the interface unit 160, the mobile terminal 100 may perform an appropriate control relating to the connected external device.

Moreover, the identification module, as a chip storing various information for authenticating usage authority of the mobile terminal 100, may include a user identity module (UIM), a subscriber identity module (SIM), and a universal subscriber identity module (USIM). A device equipped with an identification module (hereinafter referred to as an identification device) may be manufactured in a smart card form. Accordingly, the identification device may be connected to the terminal 100 through the interface unit 160.

The memory 170 may store data for supporting various functions of the terminal 100.

The memory 170 may store a plurality of application programs or applications executed in the terminal 100, pieces of data and instructions for an operation of the terminal 100, and pieces of data (for example, at least one piece of algorithm information for machine learning) for an operation of the learning processor 130.

The memory 170 may store a model that is learned in the learning processor 130 or the learning device 200.

Here, the memory 170 may store the learned model into a plurality of versions according to a learning time point, a learning progress, and the like.

Here, the memory 170 may store the input data acquired by the input unit 120, the learning data (or the training data) used for the model learning, a learning history of the model, and the like.

Here, the input data stored in the memory 170 may be input data itself, which is not processed, as well as data that is processed adequate for the model learning.

The processor 180 may control overall operations of the mobile terminal 100 generally besides an operation relating to the application program. The processor 180 may provide appropriate information or functions to a user or process them by processing signals, data, and information inputted/outputted through the above components or executing application programs stored in the memory 170.

Additionally, in order to execute an application program stored in the memory 170, the processor 180 may control at least part of the components shown in FIG. 1. Furthermore, in order to execute the application program, the processor 180 may combine at least two of the components in the mobile terminal 100 and may then operate it.

As described above, the processor 180 may control an operation associated with an application program and an overall operation of the terminal 100. For example, when a state of the terminal 100 satisfies a predetermined condition, the processor 180 may execute or release a lock state which limits an input of a control command of a user for applications.

The power supply unit 190 may receive external power or internal power under a control of the processor 180 and may then supply power to each component in the mobile terminal 100. The power supply unit 190 includes a battery and the battery may be a built-in battery or a replaceable battery.

Figure 2:
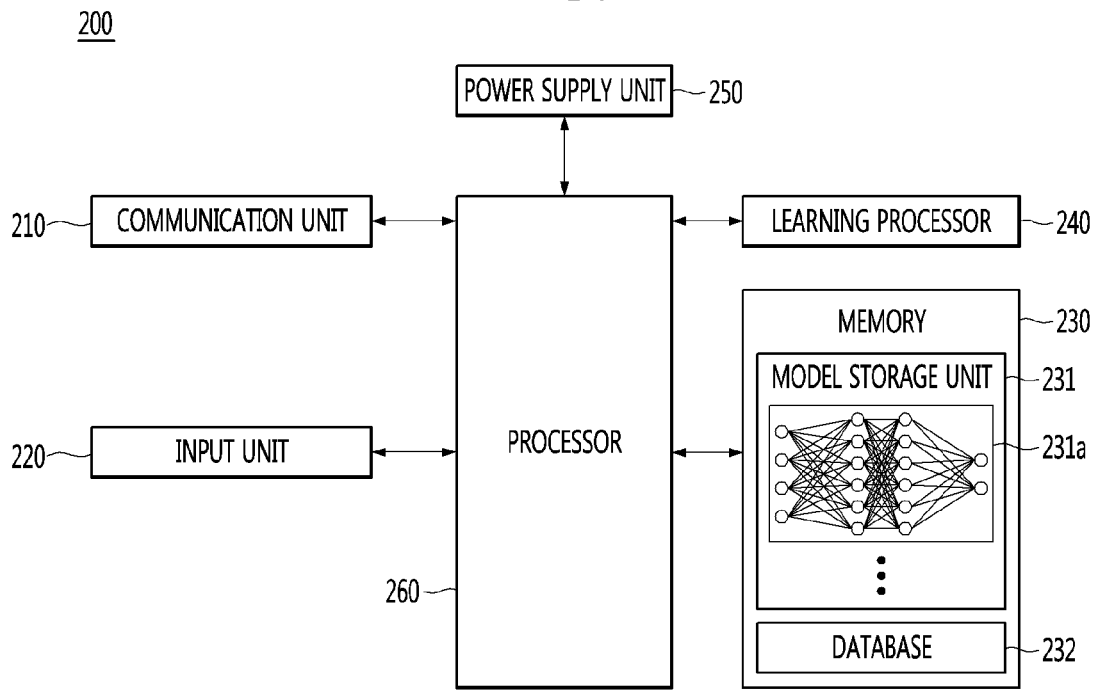
FIG. 2 is a block diagram illustrating a configuration of a learning device of an artificial neural network according to an embodiment of the present invention.

FIG. 2 is a block diagram illustrating a configuration of a learning device 200 of an artificial neural network according to an embodiment of the present invention.

The learning device 200 may be a device or server that is separately provided outside the terminal 100 and perform the same function as the learning processor 130 of the terminal 100.

That is, the learning device 200 may be configured to receive, classify, store, and output information to be used for data mining, data analysis, intelligent decision making, and machine learning algorithm. Here, the machine learning algorithm may include a deep learning algorithm.

The learning device 200 may communicate with at least one terminal 100 and analyze or train the data instead of the terminal 100 or by assisting the terminal 100 to derive results. Here, the assisting for the other devices may mean distribution of computing power through distribution processing.

The learning device 200 for the artificial neural network may be a variety of apparatuses for learning an artificial neural network and may be generally called a server or called a learning device or a learning server.

Particularly, the learning device 200 may be implemented not only as a single server but also as a plurality of server sets, a cloud server, or a combination thereof.

That is, the learning device 200 may be provided in a plurality to constitute the learning device set (or the cloud server). At least one or more learning device 200 included in the learning device set may analyze or train data through the distribution processing to derive the result.

The learning device 200 may transmit the model that is learned by the machine learning or the deep learning to the terminal periodically or by demands.

Referring to FIG. 2, the learning device 200 may include a communication unit 210, an input unit 220, a memory 230, a learning processor 240, a power supply unit 250, a processor 260, and the like.

The communication unit 210 may correspond to a constituent including the wireless communication unit 110 and the interface unit 160 of FIG. 1. That is, the communication unit 210 may transmit and receive data to/from other devices through wired/wireless communication or an interface.

The input unit 220 may be a constituent corresponding to the input unit 120 of FIG. 1 and may acquire data by receiving the data through the communication unit 210.

The input unit 220 may acquire training data for the model learning and input data for acquiring an output by using the trained model.

The input unit 220 may acquire input data that is not processed. In this case, the processor 130 may preprocess the acquired data to generate training data that is capable of being inputted into the model learning or preprocessed input data.

Here, the preprocessing for the input data, which is performed in the input unit 220, may mean extracting of an input feature from the input data.

The memory 230 is a constituent corresponding to the memory 170 of FIG. 1.

The memory 230 may include a model storage unit 231 and a database 232.

The model storage unit 231 may store a model being learned or a learned model (or an artificial neural network 231a) through the learning processor 240 to store the updated model when the model is updated through the learning.

Here, the model storage unit 231 may store the trained model into a plurality of versions according to a learning time point, a learning progress, and the like.

The artificial neural network 231a illustrated in FIG. 2 may be merely an example of the artificial neural network including a plurality of hidden layers, and the artificial neural network of the present invention is not limited thereto.

The artificial neural network 231a may be implemented as hardware, software, or a combination of the hardware and the software. When a portion or the whole of the artificial neural network 231a is implemented as the software, one or more commands constituting the artificial neural network 231a may be stored in the memory 230.

The database 232 may store the input data acquired by the input unit 220, the learning data (or the training data) used for the model learning, a learning history of the model, and the like.

The database 232 stored in the memory 232 may be input data itself, which is not processed, as well as data that is processed adequate for the model learning.

The learning processor 240 is a constituent corresponding to the learning processor 130 of FIG. 1.

The learning processor 240 may train (or learn) the artificial neural network 231a by using the training data or the training set.

The learning processor 240 may directly acquire the processed data of the input data acquired through the input unit 220 to train the artificial neural network 231a or acquire the processed input data stored in the database 232 to train the artificial neural network 231a.

Particularly, the learning processor 240 may determine optimized model parameters of the artificial neural network 231a by repeatedly learning the artificial neural network 231a by using the above-described various learning techniques.

In this specification, since the artificial neural network is learned by using the training data, the artificial neural network of which the parameters are determined may be called a learned model or a trained model.

Here, the trained model may infer a result value in a state in which the trained model is installed on the learning device 200 or may be transmitted to the other device such as the terminal 100 through the communication unit 210 so as to be mounted.

Also, when the trained model is updated, the updated trained model may be transmitted to the other device such as the terminal 100 through the communication unit 210 so as to be mounted.

The power supply unit 250 is a constituent corresponding to the power supply unit 190 of FIG. 1.

Duplicated description with respect to the constituents corresponding to each other will be omitted.

Figure 3:
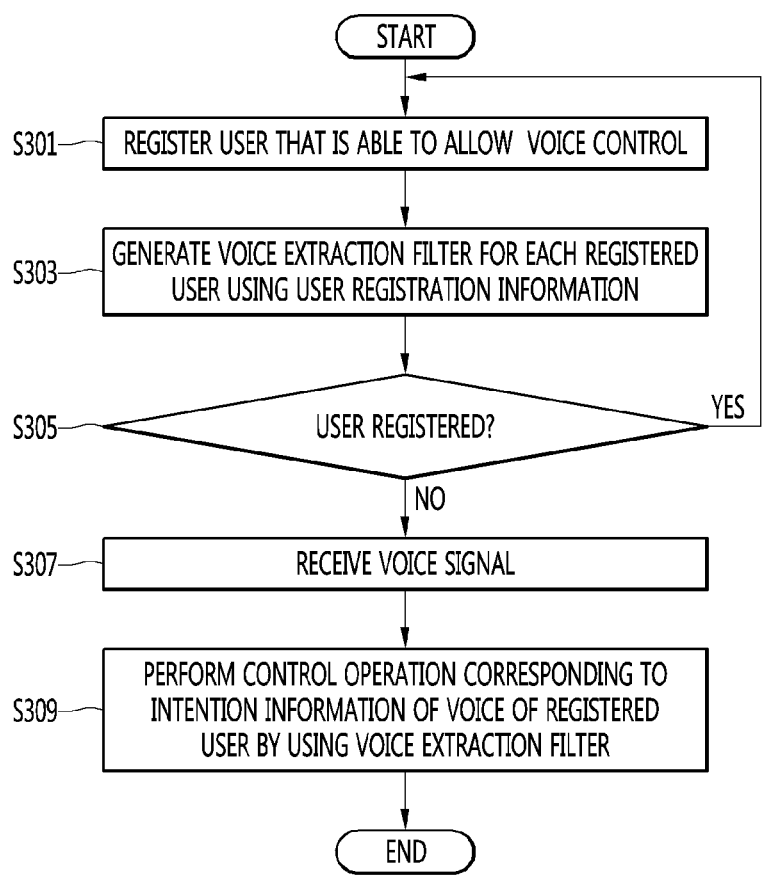
FIG. 3 is a flowchart illustrating a method for performing voice control using a voice extraction filter according to an embodiment of the present invention.

FIG. 3 is a flowchart illustrating a method for performing voice control using a voice extraction filter, according to an embodiment of the present invention.

Referring to FIG. 3, according to an embodiment of the present invention, the AI apparatus 100 for performing the voice control using the voice extraction filter according to the embodiment of the present invention receives identification information of a user that is able to allow the voice control and a voice signal of the user from the input unit 120 including the microphone 122 or the external terminal 300 and registers the user (S301).

Here, the identification information of the user may include a user name, a user registration number, a user photo, a user image, or a character string as information for distinguishing between individual users.

For example, the identification information of the user may include "mother", "father", and "me" as the titles of users, which are used to distinguish between the users.

Here, the identification information of the user may be set as a default value in the form such as a serial number or a registration number when there is absent a separate input of a user.

For example, when there is absent an input for the identification information of the user, the identification information of the user may be set in the form of "user 1", "user 2", or "user 3" in the registration order of the user.

Here, the user may modify the identification information, which is previously registered, of the user.

For example, the user may modify the identification information of the user from "user 1" to "me".

Here, the user registration may be performed through a user registration interface, and the processor 180 may provide the user registration interface through the display unit 151 or the external terminal 300. In this case, providing the user registration interface may include outputting the user registration interface in the form of an image.

Unless otherwise specified, providing the interface may refer to providing an interface through the display unit 151 of the AI apparatus 100 or an external terminal.

Here, the user registration interface may include a user registration information list for users previously registered.

Here, the user registration information list may include identification information of users, which is used to distinguish between the registered users and corresponds to user registration information for the users. The user registration information list may include information on whether the user registration information for each user is activated.

Here, the user registration interface may include an interface to manage user registration information for registered users and an interface to register a new user.

For example, the user registration interface may include a registered user correcting button, a registered user deleting button, and a new user adding button.

Here, the user registration interface may include an interface to control whether to activate the user registration information for each user. The details thereof will be described with reference to FIG. 4.

Figure 4:
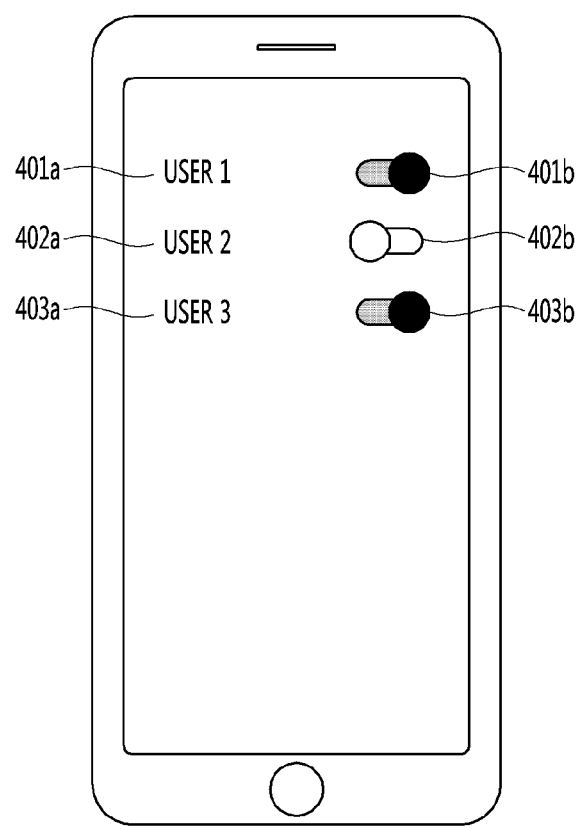
FIG. 4 is a view illustrating a user registration interface according to the embodiment of the present invention.

FIG. 4 is a view illustrating the user registration interface, according to the embodiment of the present invention.

The user registration interface may include an activation state button or a deactivation state button corresponding to the user registration information for each user.

Referring to FIG. 4, in the user registration interface, the interface to control whether to activate the user registration information for each user may include identification information 401a, 402a, and 403a of users, which are to distinguish among user registration information for the users, and buttons 401b, 402b, and 403b to display and control the activation states of the user registration information for the users corresponding to the identification information 401a, 402a, and 403a The identification information 401a of the user, which is first registered, is "user 1", and it may be recognized, through the activation state button 401b, that the user registration information for the user, which is first registered, is currently activated. Similarly, the identification information 402a of the user, which is second registered, is "user 2", and it may be recognized, through the deactivation state button 401b, that the user registration information for the user, which is second registered, is currently deactivated.

Here, when an activation state button is selected, the processor 180 may change the activation state button to a deactivation state button and user registration information for the relevant user may be deactivated. Similarly, when a deactivation state button is selected, the processor 180 may change the deactivation state button to an activation state button and user registration information for the relevant user may be activated.

Alternatively, the user registration interface may include an activation button or a deactivation button corresponding to the user registration information of each user.

In this case, the activation button is a button to activate the user registration information, and the deactivation button is a button to deactivate the user registration information.

That is, the activation button may be a button to indicate that the user registration information is deactivated and to control the user registration information to be activated when selected. Similarly, the deactivation button may be a button to indicate that the user registration information is activated and to control the user registration information to be deactivated when selected.

Accordingly, a user may easily manage user registration information for users registered through an interface. In addition, the user may easily manage registered users that are able to allow voice control.

Hereinafter, the description will be made again with reference to FIG. 3.

Here, the user registration interface may include an interface to set authority information of each user which is registered.

Here, the interface to set the authority information may include an interface to set a required authority level for each control item. The details thereof will be described below with reference to FIG. 5.

FIG. 5 is a view illustrating required authority information for each control item, according to the embodiment of the present invention.

Referring to FIG. 5, control items may be basically classified in an application unit, and thus a required authority level may be set for each application.

In a home IoT device control application and a music application that do not include personal information or have a low risk for security issues, a required authority level may be set to '1'.

In a calendar application, a mail application, a messenger application, and a contact applications that do not cause serious security issues but include personal information, the required authority level may be set to '2'.

In an authentication application (such as an OTP application), a bank application, and a payment application having the possibility to cause serious security issues, the required authority level may be set to '3'.

Although FIG. 5 illustrates that the required authority levels are divided into three stages of '1' to '3', the required authority levels may be more sub-divided or more simplified depending on the reproduction of the present invention.

For an application as a control item, required authority information may be set, but it is not efficient for a user to set required authority information for all applications one by one. Accordingly, the required authority information may be set according to not only applications, but also the functions of control items or the range of data to be handled.

For example, in a function or a control item, such as a home control or media service, which does not require personal information, a required control level may be set to '1'.

In a function or a control item having a function of handling personal information, the required control level may be set to '2'.

In the function or the control item having the function of handling the financial information or the personal authentication information, the required control level may be set to '3'.

Here, the required authority information may include additional authentication information.

For example, a control item, which has the required authority level of '3', may be set to require iris recognition or fingerprint recognition for additional authentication.

When the required authority information illustrated in FIG. 5 is employed, and when the whole authority information of a certain user is 2, the user may control various applications to handle personal information as well as the home control or the media control through the voice control.

Although the examples are illustrated in that the authority level having the greater number refers to higher authority, the examples may be, to the contrary, reproduced such that the authority level having the less number refers to higher authority Hereinafter, the description will be made again with reference to FIG. 3.

Here, the interface to set the authority information may include an interface to individually set authority information for each control item to be controlled through a voice of each user or an interface to set the whole authority information representing each user. Hereinafter, the description will be made again with reference to FIG. 3.

FIG. 6 is a view illustrating authority information of each user according to an embodiment of the present invention.

Referring to FIG. 6, the authority information of each user may include the whole authority information and the individual authority information.

Here, the whole authority information may be used as default authority information for a specific user. The whole authority information may be used for a control item to which the individual authority information is not set, in place of the individual authority information.

Here, the individual authority information may include an access permission state or a control permission state for each application as each control item.

For example, as illustrated in FIG. 5, it is assumed that the required authority level for an application that provides home control and a media service is 1, the required authority level for an application that handles personal information is 2, and the required authority level for an application that handles financial information or personal authentication information is 3.

In the case of "user 1", as the whole authority level is set to '1', voice control is possible with respect to the home IoT device control application or the music application which has the required authority level of '1'. In addition, voice control is possible with respect to even a calendar application, which has the required authority level of '2', due to the individual authority information even though the whole authority level is '1'.

In the case of "user 2", as the whole authority level is set to '2', voice control is possible with respect to even applications of handling the personal information, which have the required authority level of '2'. However, voice control is impossible with respect to even a messenger application, which has the required authority level of '2', due to the individual authority information even though the whole authority level is '2'.

In the case of "user 3", as the whole authority level is set to '3', voice control is possible with respect to even applications of handling financial information or the personal information, which have the required authority level of '3'.

Hereinafter, the following description will be made again with reference to FIG. 3.

Here, the processor 180 may set the required authority information to a default value and may provide the required authority information as in illustrated in FIG. 5, and may update the required authority information depending on the input of the user.

Here, the processor 180 may store, in the memory 170, the required authority information for each control item or the authority information for each user.

The learning processor 130 of the AI apparatus 100 for performing voice control or the learning processor 240 of the learning server 200 may generate a voice extraction filter for each registered user using the user registration information (S303).

Here, the voice extraction filter, which is a filter that separates or extracts the voice of a specific person from a sound source, may be referred to as a voice separation filter.

Here, the voice extraction filter may be generated from an artificial neural network (ANN) learned through a machine learning algorithm or a deep learning algorithm. In this case, the input data of the artificial neural network is information for distinguishing between voice signals and users, and the voice extraction filter is a voice extraction filter for a target user having a voice to be extracted.

Here, the learning processor may generate a voice extraction filter to correspond to each registered user.

In detail, the learning processor receives, as input data, information indicating a target user having a voice to be extracted and an input voice signal including a voice signal of the user.

The information indicating the user is a kind of a label used to distinguishing between target users having voices to be extracted and may be expressed in the form of one hot vector or one scalar, when the voice extraction filter is learned.

For example, when the information indicating a user is expressed in the form of one hot vector, and the dimension of the one hot vector is 8-dimension, the information indicating the first user may be expressed in the form such as [1, 0, 0, 0, 0, 0, 0, 0] and the information indicating the second user may be expressed in the form such as [1, 0, 0, 0, 0, 0, 0, 0].

The learning processor extracts an input feature vector if necessary when the input data is received and inputs the extracted input feature vector or the input data into the ANN.

The ANN outputs the voice extraction filter as the target feature vector at an output layer through at least one hidden layer as input data or an input feature vector is input.

The model parameters of the ANN are updated and learned such that a cost function is minimized.

The cost function of the ANN may have the relationship proportional to the difference between a voice signal of the target user, which is extracted from the input voice signal, using the voice extraction filter output as the target feature vector and a voice signal of the target user included in the input voice signal.

Figure 7:
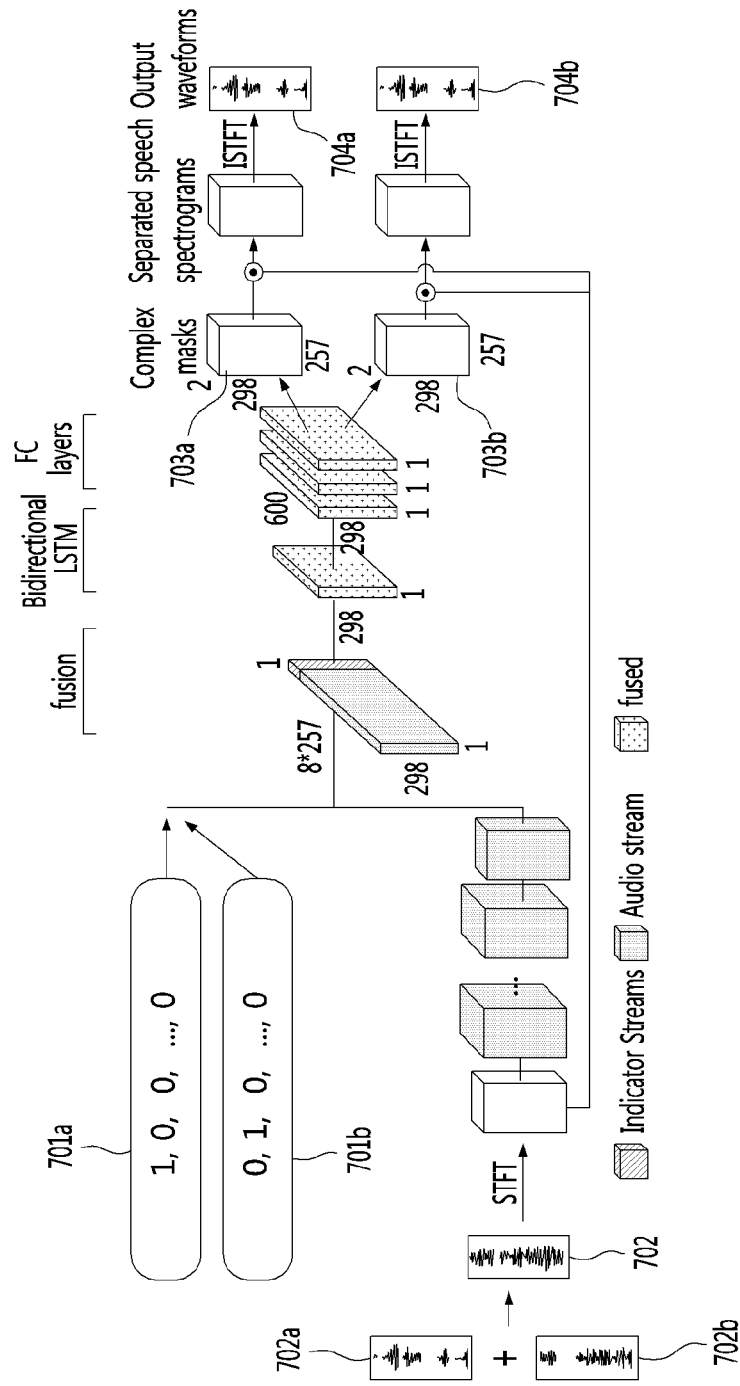
FIG. 7 is a view illustrating a method for generating a voice extraction filter according to an embodiment of the present invention.

FIG. 7 is a view illustrating a method for generating the voice extraction filter according to an embodiment of the present invention.

FIG. 7 illustrates the learning process of the ANN to generate voice extraction filters corresponding to users, respectively, when two users are registered.

Referring to FIG. 7, when the voice signal of the first user is referred to as a first voice signal 702*a*, the voice signal of the second user is referred to as a voice signal 702*b*, and the combined signal of the first voice signal 702*a* and the second voice signal 702*b* is referred to as a third voice signal 702, the information indicating each user and the third voice signal are input, as input data, to the ANN for generating the voice extraction filter.

The information 701*a* indicating the first user is one hot vector in which the first element has the value of '1' and remaining elements have the values of '0s'. The information 701*b* indicating the second user is one hot vector in which the second element has the value of '1' and remaining elements have the value of '0'.

Although FIG. 7 illustrates the information 701*a* indicating the first user and the information 701*b* indicating the second user together, data actually input is one of them. In other words, information indicating the user indicates a target user having a voice to be extracted by the voice extraction filter depending on the values of the information.

If the information 701*a* indicating the first user is input, as the input data, into the ANN, the output target feature vector becomes a first voice extraction filter 703*a* to extract the voice of the first user.

In this case, the cost function is set in proportion to the difference between the voice signal 704*a* of the first user, which is extracted from the third voice signal 702 using the first voice extraction filter 703*a* output from the ANN, and the first voice signal 702*a*.

If the information 701*b* indicating the second user is input, as the input data, into the ANN, the output target feature vector becomes a second voice extraction filter 703*b* to extract the voice of the second user.

In this case, the cost function is set in proportion to the difference between the voice signal 704*b* of the second user, which is extracted from the third voice signal 702 using the second voice extraction filter 703*a* output from the ANN, and the second voice signal 702*a*.

Here, the ANN may include one or more neural networks including a convolution neural network (CNN).

The ANN in the example of FIG. 7 includes a convolutional layer, a bidirectional Long-Short Term Memory (LSTM) layer and a fully-connected layer.

That is, the value of the cost function is more reduced as the voice of the user is more exactly extracted through the voice extraction filter, and the ANN is learned to minimize the cost function. Accordingly, the generated voice extraction filter more exactly extracts the voice of the target user as the learning progresses.

Here, the technical component of the voice extraction filter or the voice extraction mask is a ratio mask (RM: ratio mask) to distinguish between clean/noise through '0'/'1', but may be implemented with or a complex ratio mask (cRM).

Hereinafter, the following description will be made with reference to FIG. 3.

Here, the voice extraction filter generated through the learning processor may be stored in the memory 170.

When the voice extraction filter is generated by the learning processor 130 of the AI apparatus 100, the processor 180 may directly store the voice extraction filter in the memory 170. When the voice extraction filter is generated by the learning processor 240 of the learning server 200, the processor 180 may store the generated voice extraction filter in the memory 170 by receiving the generated voice extraction filter through the communication unit 110.

Here, the voice extraction filter generated by the learning processor 240 of the learning server 200 may be stored in the memory 230 of the learning server 200.

Here, the generated voice extraction filter may be stored in a voice server 400.

The processor 180 of the AI apparatus 100 that performs voice control determines whether to additionally register a user or to modify information on users who are previously registered (S305).

Whether to additionally register a user or to modify information on users who are previously registered may be determined by the input of the user.

That is, step S305 may be understood as determining whether the user performs an input to additionally register the user, or whether the user performs an input to change the registered user information.

If the additional registration of the user is necessary as the determination result of step S305, the processor 180 returns to step S301 of registering the user.

If the additional registration of the user is not required as the result of step S305, the processor 180 of the AI apparatus 100 to perform the voice control receives an input voice signal for performing the voice control (S307).

The input voice signal may include various noises as well as the voice of the user to perform the voice control. In addition, the input voice signal may include voices of users that are not registered, or may include several users that are registered.

Here, the processor 180 may receive the input voice signal through the microphone 130 of the AI apparatus 100 to perform the voice control or may receive the input voice signal, which is obtained through a microphone of the external terminal 300, through the communication unit 110.

The processor 180 of the ANN 100, which is to perform the voice control, performs a control operation corresponding to the intention information or the sematic information of the voice of the registered user by using the voice extraction filter (S309).

Here, when the processor 180 may receive an input voice signal, the processor 180 extracts a voice signal for the registered user using the voice extraction filter for the registered user, and may perform voice control corresponding to the intention information of the extracted voice signal.

Here, the processor 180 may directly extract a voice of the registered user from the input voice signal using the voice extraction filter or may transmit an input voice signal to the learning server 200 or the voice server 400 and receive a voice of the user, which is extracted using a voice extraction filter.

Here, the processor 180 performs a voice control item corresponding to the intention information or the sematic information of the extracted voice signal when the voice of the registered is extracted. In this case, the intention information or the sematic information of the extracted voice signal may be directly obtained by the processor 180 or may be received from the voice server.

That is, when the input voice signal is received, the processor 180 may transmit the input voice signal to the voice server, and the voice server may extract the user voice from the input voice signal using a voice extraction filter, may obtain the intention information or the sematic information of the user voice extracted using a natural language processing technique such as NLP, and may transmit the intention information or semantic information of the extracted user voice to the AI apparatus 100.

Here, the voice server may transmit the intention information or the sematic information of the extracted voice to the AI apparatus 100, but may generate a control signal corresponding to the intention information or the sematic information and transmit the control signal to the AI apparatus 100.

Although FIG. 3 illustrates that the control operation is terminated after finished, the control operation may return to step S305 of determining whether to register a user and may be recursively performed.

The details of the method for perform the control operation will be described with reference to FIG. 8.

Figure 8:
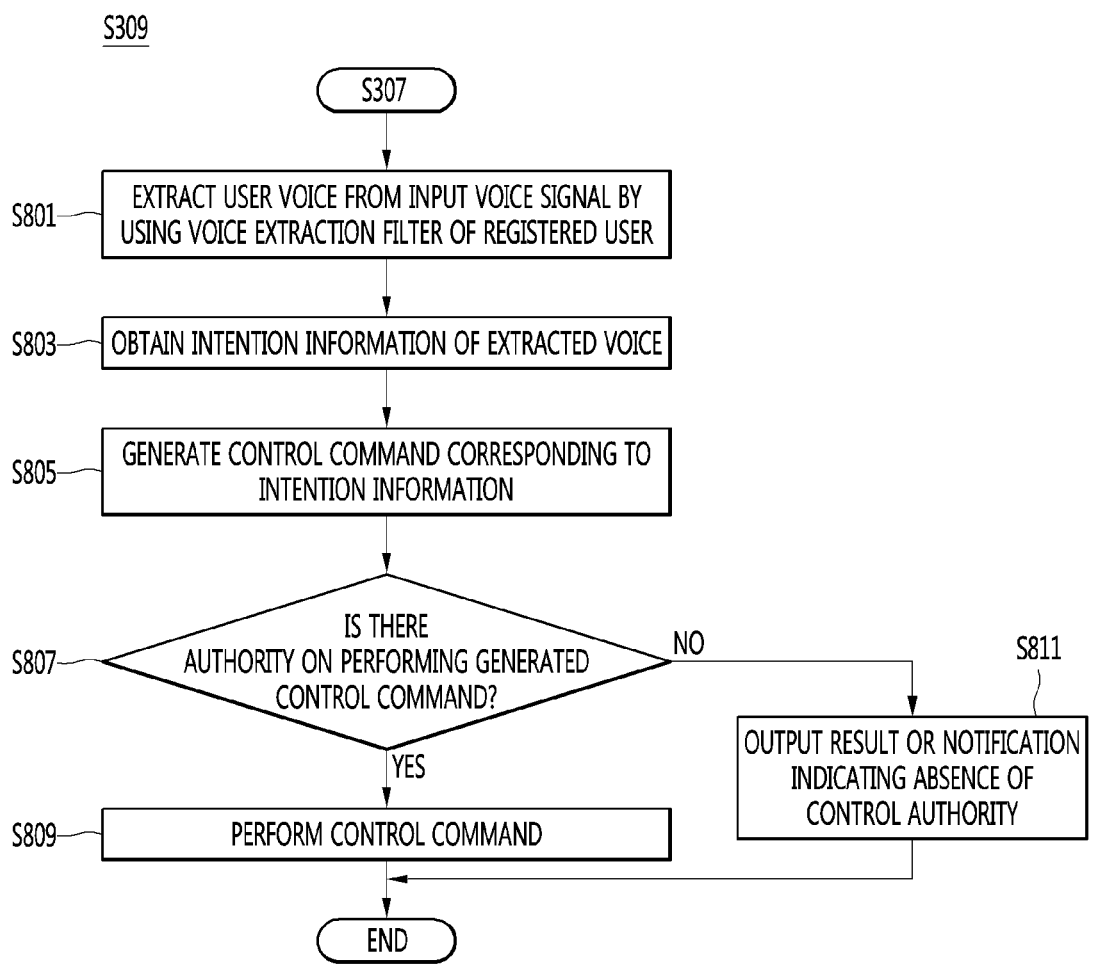
FIG. 8 is a flowchart illustrating an example of a step S309 of performing a control operation illustrated in FIG. 7 according to an embodiment.

FIG. 8 is a flowchart illustrating an example of a step S309 of performing the control operation illustrated in FIG. 7 according to an embodiment.

Referring to FIG. 8, the processor 180 of the AI apparatus 100 or the voice server extracts a user voice from an input voice signal by using a voice extraction filter of the registered user (S801).

Here, the processor 180 may extract a voice using a voice extraction filter only with respect to only users, which have activated user registration information, of registered users.

For example, when the user registration information of "user 2" is deactivated if "user 1", "user 2" and "user 3" are registered, the processor 180 may extract voice only with respect to "user 1" and "user 3".

The processor 180 of the AI apparatus 100 or the voice server obtains intention information or sematic information of the extracted voice with respect to the registered user (S803).

When intention information or sematic information of the extracted voice is obtained, various natural language processing techniques may be used.

Here, the intention information or sematic information of the extracted voice may include information on keywords corresponding to the meaning of the extracted voice.

For example, when the extracted voice is "turn off the light in 10 minutes", the intention information or the sematic information of the extracted voice may include "in 10 minutes", "light", and "turn off".

Although not illustrated in FIG. 8, the processor 180 of the AI apparatus 100 or the voice server may obtain the intention information or sematic information of the extracted voice, when the level of the extracted voice does not exceed a preset reference value.

The processor 180 of the AI apparatus 100 or the voice server generates a control command corresponding to the intention information or sematic information (S805).

In this case, the control command may refer to a control signal or a control command signal.

The processor 180 of the AI apparatus 100 determines whether there is an authority on performing the generated control command (S807).

When the input voice signal is input, the processor 180 may extract voice using a voice filter of the registered user and generates the control command corresponding to the extracted voice. Accordingly, the processor 180 can distinguish the registered user of each voice command.

That is, the processor 180 may determine whether a target user having uttered a voice corresponding to the generated control command has the authority on performing the generated control command, by using the required authority information for each control item and authority information of each user.

If there is present the authority on performing the generated control command as the determination result of step S807, the processor 180 performs the control command (S809).

Here, the processor 180 may perform the control command and may output a result from the control command and a notification associated with performing the control command.

For example, when the control command generated based on the voice of a user is "turn off the light in 10 minutes", and when the user has the authority on performing the control command, the processor 180 may set a timer or a reservation function so as to turn off the light in 10 minutes and may output a notification indicating that the command is normally input or the result of the command.

Alternatively, when the control command generated from the voice of the user is "turn off the light" and when there is present the authority on performing the corresponding command, the processor 180 may directly turn off the light and may output the notification indicating that the light is turned off or the result of the command.

If the control command has the situation that the result from the control command is instantly verified, a notification indicating that the control command has been performed may not be output separately.

For example, if the control command is "turn off the light" and the user is under the situation of verifying that the light are immediately turned off, it is enough only to turn off the light by performing the control command, and it is not necessary to provide, for the user, the notification indicating that the light is turned off.

Whether to output the result or the notification may be provided variously depending on the settings of the user.

When additional authentication or an additional behavior is required even if the user has a control authority, the processor 180 may provide a notification of requiring the additional authentication or the additional behavior.

For example, when fingerprint authentication or iris authentication is additionally required even if there is present the control authority in the financial application, and when the control command of the financial application of the user having the authority is performed. the processor 180 may provide a notification that the fingerprint authentication or the iris authentication is necessary Here, when a plurality of control commands are simultaneously input as the input voice signal includes voices of a plurality of registered users, the processor 180 determines the rank of the plurality of control commands according to a predetermined ranking rule. The control commands may be performed in descending order of rank.

Here, the processor 180 may provide an interface for setting a ranking rule.

Here, the ranking rule may be a rule for giving a higher rank to the control command of the user, which has higher whole authority information, of the plurality of control commands. For example, when the "user 1" has the whole authority information of level 3, and "user 2" has the whole authority information of level 2, the processor 180 may process the voice control command of "user 1" with the first priority and the voice control command of "user 2" with the second priority even if voice control commands of two users are simultaneously input.

Here, the ranking rule may be a rule of providing a higher priority to a control command, which has the higher sound level, of a plurality of control commands.

For example, when the level of the voice uttered by "user 1" is lower than the level of the voice uttered by "user 2", even if the voice control commands of two users are simultaneously input, the processor 180 may process the control command of the "user 2" with the first priority and process the control command of the "user 1" with the second priority.

Here, the ranking rule may be a rule of providing priorities to a plurality of control commands based on both the sound level and the whole authority information for a control operation.

Here, the priorities between the sound level and the whole authority information may be varied depending on a preset default value or a setting value by a user.

Here, the processor 180 may provide an interface to set the priorities between the sound level and the whole authority information.

For example, it is assumed that the whole authority information has the priority higher than the priority of the sound level in the default value or the setting value by the user. In addition, it is assumed that the whole authority information of the "user 1" has the level of '3', and the sound level of the "user 1" is 70 dB, the whole authority information of the "user 2" has the level of '2' and the sound level of the "user 2" is 80 dB, and the whole authority information of the "user 3" has the level of '3' and the sound level of the "user 3" is 60 dB.

In this case, the processor 180 may perform the control command of the "user 2" with the third priority because the whole authority information has the lowest level of '2' even though the "user 2" has the highest sound level. In addition, the processor 180 may perform the control command of the "user 1" with the first priority and the control command of the "user 3" with the second priority because the "user 1" has the same whole authority information, which is the level of '3', as that of the "user 3", but the "user 1" has a sound level higher than a sound level of the "user 1".

In particular, the priorities between a plurality of control commands may refer to the importance instead of merely referring to the sequence of performing the control commands.

Here, if two opposed control commands are input with respect to the same control item, the processor 180 may perform only a control command having the higher priority and may not perform the opposed control command having the lower priority.

For example, when the control command of the "user 1" having the level of '3' in the whole authority information is "turn on the light", and the control command of the "user 2" having the level of '2' in the whole authority information is "turn off the light", the processor 180 may perform only the control command of "turn on the light" of the "user 1" having the higher priority as the whole authority information is higher.

If there is absent any authority for performing the control command as the determination in step S807, the processor 180 outputs a result or a notification indicating absence of a control authority without performing the control command (S811).

Figure 9:
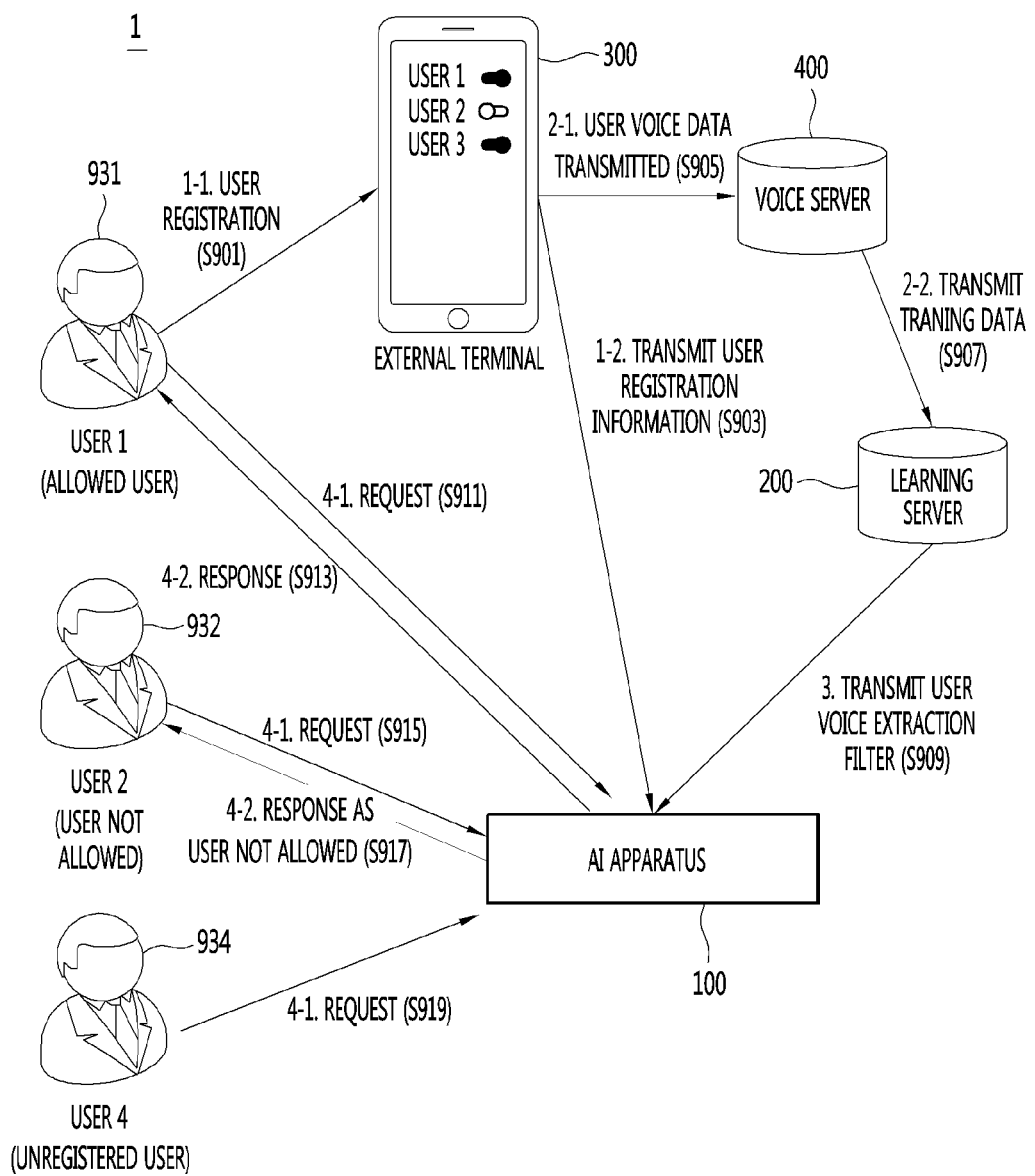
FIG. 9 is a view illustrating a system for performing voice control using a voice extraction filter according to an embodiment of the present invention.

FIG. 9 is a view illustrating a system 1 for performing voice control using a voice extraction filter according to an embodiment of the present invention.

Referring to FIG. 9, the system 1 for performing voice control using the voice extraction filter according to an embodiment of the present invention may include the AI apparatus 100 to perform the voice control, the learning server 200, the external terminal 300, and the voice server 400. However, the system 1 for performing voice control may be configured without at least one of the learning server 200, the external terminal 300, or the voice server 400 depending on configurations.

A user registers another user through the external terminal 300 so as to manage users that are able to allow voice control (S901).

Although FIG. 9 illustrates that user 1 931 makes a registration, the registration may be made by another user.

Here, the external terminal 300 may provide an interface for user registration, and the provided interface may include user identification information and activation state information of the user registration information.

The user registration information may include control authority information for each user as described above, In FIG. 9, the user 1 931, the second user 932, and the third user are all registered. However, the user 1 931 and the third user are activated in user registration information so the voice control of the user 1 931 and the third user is allowed. The second user 932 is deactivated in user registration information so the voice control of the second user 932 is not allowed. In addition, a fourth user 934 is not registered.

When a user is registered, the external terminal 300 transmits the user registration information to the AI apparatus 100 to perform the voice control (S903).

The AI apparatus 100 may determine whether to perform a control command corresponding to a voice signal when the voice signal is received from user 1, 2, and 3 931, 932, or 933 thereafter, by using the received user registration information.

In addition, if the user is registered, the external terminal 300 may transmit user voice data to the voice server 400 (S905).

The voice server 400 may function as a data management server to store and manage voice data.

In addition, the voice server 400 may function, according to embodiments, as a voice data computation server to obtain the intention information or the sematic information as natural language processing is performed with the input voice signal.

The voice server 400 may include a single server or may include one set of servers.

The voice server 400 transmits training data for using to generate the voice extraction filter of each user to the learning server 200 (S907).

The learning data may include voice data for each of registered users, and information indicating a user of the voice data.

The learning server 400 generates the voice extraction filter corresponding to each of the registered users using the received learning data and transmits the generated voice extraction filter to the AI apparatus 100 (S909).

When the user 1 931 allowed in voice control gives a speech to the AI apparatus 100 to request the voice control (S911), the AI apparatus 100 extracts the voice of the "user 1" from the input voice signal, using the voice extraction filter of the "user 1". In addition, the AI apparatus 100 performs a control command corresponding to the voice of the "user 1" and provides the response to the user 1 931 (S913).

When the user 2 932 not allowed in voice control transmits a request for the voice control to the AI apparatus 100 (S915) through the speech, the AI apparatus 100 does not perform the voice control since the user 2 932 is not allowed in voice control, and provides a response including at least one of a reason or the result that the voice control is not performed to the user 2 932 (S917).

When unregistered user 4 934 transmits a request for voice control to the AI apparatus 100 through speech (S919), the AI apparatus 100 does not make a separate response since the user 4 934 is not registered.

In detail, since the voice extraction filter corresponding to the unregistered user 4 934 is not absent, the AI apparatus 100 does not extract the voice of the user 4 934 from the input voice signal, and thus does not make any determination for the voice of the user 4 934.

Although FIG. 9 illustrates components to perform voice control based only on whether the user is registered or whether the voice control of a registered user is activated, the voice control may be performed based on control authority information for each user according to various embodiments of the user.

According to an embodiment of the present invention, the above-described method may be implemented as a processor-readable code in a medium where a program is recorded. Examples of a processor-readable medium may include hard disk drive (HDD), solid state drive (SSD), silicon disk drive (SDD), read-only memory (ROM), random access memory (RAM), CD-ROM, a magnetic tape, a floppy disk, and an optical data storage device.

What is claimed is:

1. An artificial intelligence (AI) apparatus for performing voice control, comprising:
a display;
a memory configured to store a voice extraction filter for extracting a voice of a registered user; and
a processor configured to:
receive identification information of a user, authority information of the user, and a first voice signal from the user, wherein the authority information is set for each registered user and comprises individual authority information for each control item and global authority information for control items corresponding to a default authority information set for specific users, register the user using the received identification information and the received authority information, cause the display to output user registration information for the registered user including a unique identifier for the registered user and a status of whether the user registration information is activated or deactivated, based on receiving a second voice signal, extract a voice of the registered user from the received second voice signal by using the voice extraction filter corresponding to the registered user, wherein the voice extraction filter is based on the received first voice signal such that a particular voice extraction filter is based on each registered user, and generate a control command corresponding to intention information of the extracted voice of the registered user, wherein the controller is further configured to:

based on simultaneously receiving a plurality of control commands as an input voice signal including voices of a plurality of registered users, determine a rank of the received plurality of control commands according to a sound level of each of the received plurality of control commands and the received global authority information and perform control operations corresponding to the received plurality of control commands in a descending order of rank.

2. The AI apparatus of claim 1, wherein the processor is further configured to:

receive an input for activating or deactivating at least one user registration information for registered users; and determine whether a user having deactivated user registration information is an unregistered user or an unauthorized user.

3. The AI apparatus of claim 2, wherein the processor is further configured to only extract a voice from users having activated user registration information.

4. The AI apparatus of claim 1, wherein the processor is further configured to:

determine whether an authority is present on a control item corresponding to the intention information of the extracted voice based on the received authority information of the user; and perform a control operation on the control item based on a determination that the user has the authority on the control item.

5. The AI apparatus of claim 1, wherein the voice extraction filter is output as a target feature vector in an artificial neural network, and wherein the artificial neural network is trained to reduce a difference between the extracted voice of the user based on input data including an input voice signal including the first voice signal of the user and information indicating that the registered user is inputted, wherein the extracted voice of the user is extracted from the input voice signal by using the outputted target feature vector.

6. The AI apparatus of claim 5, further comprising:

a communication unit configured to communicate with at least one of a voice server or a learning server, wherein the processor is further configured to:

transmit the received first voice signal to at least one of the voice server or the learning server based on the first voice signal being received; and receive the voice extraction filter trained by using the first voice signal from the learning server.

7. The AI apparatus of claim 6, wherein the processor is further configured to:

transmit the extracted voice to the voice server;

receive, from the voice server, intention information of the extracted voice or control information corresponding to the intention information; and perform a control operation corresponding to the received intention information or the received control information.

8. A method for performing voice control, the method comprising:

receiving identification information of a user, authority information of the user, and a first voice signal from the user, wherein the authority information is set for each registered user and comprises individual authority information for each control item and global authority information for control items corresponding to a default authority information set for specific users;

registering the user using the received identification information and the received authority information;

displaying output user registration information for a registered user including a unique identifier for the registered user and a status of whether the user registration information is activated or deactivated, based on receiving a second voice signal, extracting a voice of the registered user from the received second voice signal by using a voice extraction filter corresponding to the registered user, wherein the voice extraction filter is based on the received first voice signal such that a particular voice extraction filter is based on each registered user; and generating a control command corresponding to intention information of the extracted voice of the registered user, wherein the controller is further configured to:

based on simultaneously receiving a plurality of control commands as an input voice signal including voices of a plurality of registered users, determine a rank of the received plurality of control commands according to a sound level of each of the received plurality of control commands and the received global authority information and perform control operations corresponding to the received plurality of control commands in a descending order of rank.

9. A non-transitory memory storing one or more programs, which, when executed by one or more processors of a device, cause the device to be configured to perform voice control, the one or more processors comprising instructions for:

receiving, by a processor among the one or more processors, identification information of a user, authority information of the user, and a first voice signal from the user, wherein the authority information is set for each registered user and comprises individual authority information for each control item and global authority information for control items corresponding to a default authority information set for specific users;

registering, by the processor, the user using the received identification information and the received authority information;

displaying output user registration information for a registered user including a unique identifier for the registered user and a status of whether the user registration information is activated or deactivated, based on receiving a second voice signal, extracting, by the processor, a voice of the registered user from the received second voice signal by using a voice extraction filter corresponding to the registered user, wherein the voice extraction filter is based on the received first voice signal such that a particular voice extraction filter is based on each registered user, and generating, by the processor, a control command corresponding to intention information of the extracted voice of the registered user, wherein the one or more processors further comprise instructions for:

based on simultaneously receiving a plurality of control commands as an input voice signal including voices of a plurality of registered users, determine a rank of the received plurality of control commands according to a sound level of each of the received plurality of control commands and the received global authority information and perform control operations corresponding to the received plurality of control commands in a descending order of rank.

* * * * *